US012647300B2

(12) United States Patent
Otsu et al.

(10) Patent No.: US 12,647,300 B2
(45) Date of Patent: Jun. 2, 2026

(54) VEHICLE-MOUNTED COMMUNICATION SYSTEM, RELAY DEVICE, AND RELAY METHOD

(71) Applicants: AutoNetworks Technologies, Ltd., Yokkaichi (JP); Sumitomo Wiring Systems, Ltd., Yokkaichi (JP); Sumitomo Electric Industries, Ltd., Osaka (JP)

(72) Inventors: Tomohiro Otsu, Yokkaichi (JP); Takeshi Hagihara, Yokkaichi (JP); Hirofumi Urayama, Yokkaichi (JP); Darmawan Go, Yokkaichi (JP); Yoshitaka Kikuchi, Yokkaichi (JP); Hideyuki Tanaka, Osaka (JP); Tatsuya Izumi, Osaka (JP); Yusuke Yamamoto, Osaka (JP)

(73) Assignees: AutoNetworks Technologies, Ltd., Yokkaichi (JP); Sumitomo Wiring Systems, Ltd., Yokkaichi (JP); Sumitomo Electric Industries, Ltd., Osaka (JP)

( * ) Notice: Subject to any disclaimer, the term of this patent is extended or adjusted under 35 U.S.C. 154(b) by 229 days.

(21) Appl. No.: 18/556,134

(22) PCT Filed: Mar. 25, 2022

(86) PCT No.: PCT/JP2022/014308
§ 371 (c)(1),
(2) Date: Oct. 19, 2023

(87) PCT Pub. No.: WO2022/230496
PCT Pub. Date: Nov. 3, 2022

(65) Prior Publication Data
US 2024/0223400 A1 Jul. 4, 2024

(30) Foreign Application Priority Data

Apr. 30, 2021 (JP) ................................. 2021-077516

(51) Int. Cl.
*H04L 12/46* (2006.01)
*B60R 16/023* (2006.01)
(52) U.S. Cl.
CPC ............ *H04L 12/46* (2013.01); *B60R 16/023* (2013.01)
(58) Field of Classification Search
CPC .............................. H04L 12/46; B60R 16/023
(Continued)

(56) References Cited

U.S. PATENT DOCUMENTS 10,027,672 B2 7/2018 Noda et al.
2015/0326529 A1 11/2015 Morita
(Continued)

FOREIGN PATENT DOCUMENTS

| CN | 104955680 | A | | 9/2015 |
| CN | 112602303 | A | | 4/2021 |
| JP | 2019-129500 | | | 8/2019 |
| JP | 2021172308 | A | * | 11/2021 |
| WO | 2018-047510 | A1 | | 3/2018 |

OTHER PUBLICATIONS

International Search Report, Application No. PCT/JP2022/014308, mailed Jun. 21, 2022. ISA/Japan Patent Office.

*Primary Examiner* — Sibte H Bukhari
(74) *Attorney, Agent, or Firm* — Honigman LLP

(57) ABSTRACT

A vehicle-mounted communication system includes: a plurality of vehicle-mounted devices; and a relay device, wherein a first vehicle-mounted device of the vehicle-mounted devices transmits a frame addressed to a second vehicle-mounted device of the vehicle-mounted devices to the relay device, the frame being a frame for transmission and reception of information between the first vehicle-mounted device and the second vehicle-mounted device, and (Continued)

the relay device determines whether or not relay of the frame to the second vehicle-mounted device is permissible based on a result of comparison between a required safety level and a system safety level, the required safety level being a level of safety required for communication between the first vehicle-mounted device and the second vehicle-mounted device, the system safety level being at least based on function safety levels of the first vehicle-mounted device and the second vehicle-mounted device regarding safety of a vehicle.

10 Claims, 9 Drawing Sheets

(58) Field of Classification Search
USPC ........................................................ 370/401
See application file for complete search history.

(56) References Cited

U.S. PATENT DOCUMENTS

| | | |
|---|---|---|
| 2015/0358329 A1 | 12/2015 | Noda et al. |
| 2017/0150361 A1 | 5/2017 | Paryani et al. |
| 2021/0400452 A1 | 12/2021 | Baba et al. |
| 2022/0158900 A1 | 5/2022 | Yamamoto et al. |

* cited by examiner

FIG. 3

Lsy

| SYSTEM ID | SYSTEM SAFETY LEVEL | CONSTITUTIONAL ELEMENTS | SAFETY MECHANISM | FUNCTION SAFETY LEVEL |
|---|---|---|---|---|
| S001 | B | VEHICLE-MOUNTED ECU 111A | ECC etc | B |
|  |  | VEHICLE-MOUNTED ECU 111B | ECC etc | C |
| S002 | C | VEHICLE-MOUNTED ECU 111A | ECC etc | B |
|  |  | VEHICLE-MOUNTED ECU 111B | ECC etc | C |
|  |  |  | CRC | - |
| · · · · | · · · · | · · · · | · · · · | · · · · |

FIG. 4

Lse

| SERVICE ID | REQUIRED SAFETY LEVEL |
|:---:|:---:|
| 1001 | B |
| 1002 | C |
| ⋮ | ⋮ |
| 2001 | D |
| 2002 | D |
| 2003 | D |
| ⋮ | ⋮ |

FIG. 5

Lsy

| SYSTEM ID | SYSTEM SAFETY LEVEL | CONSTITUTIONAL ELEMENTS | SAFETY MECHANISM | FUNCTION SAFETY LEVEL |
|---|---|---|---|---|
| S001 | C | VEHICLE-MOUNTED ECU 111A | ECC etc | C |
|  |  | VEHICLE-MOUNTED ECU 111B | ECC etc | C |
| S002 | D | VEHICLE-MOUNTED ECU 111A | ECC etc | C |
|  |  | VEHICLE-MOUNTED ECU 111B | ECC etc | C |
|  |  | - | CRC | - |
| · · · · | · · · · | · · · · | · · · · | · · · · |
| S101 | B | VEHICLE-MOUNTED ECU 111A | ECC etc | C |
|  |  | VEHICLE-MOUNTED ECU 111C | ECC etc | B |

FIG. 6

Lse

| SERVICE ID | REQUIRED SAFETY LEVEL |
|---|---|
| 1001 | B |
| 1002 | C |
| ⋮ | ⋮ |
| 2001 | D |
| 2002 | D |
| 2003 | D |
| ⋮ | ⋮ |
| 3001 | D |

VEHICLE-MOUNTED COMMUNICATION SYSTEM, RELAY DEVICE, AND RELAY METHOD

CROSS-REFERENCE TO RELATED APPLICATIONS

This application is the U.S. national stage of PCT/JP2022/014308 filed on Mar. 25, 2022, which claims priority of Japanese Patent Application No. JP 2021-077516 filed on Apr. 30, 2021, the contents of which are incorporated herein.

TECHNICAL FIELD

The present invention relates to a vehicle-mounted communication system, a relay device, and a relay method.

BACKGROUND

WO 2020/145334 discloses the following technology. A vehicle control device controls a plurality of repeaters based on a control scenario in which states of a vehicle, in which a vehicle network constituted by the plurality of repeaters is established, are associated with control content to be set for each of the repeaters.

There is demand for a technology that can improve security in a vehicle-mounted network more than the technologies described in WO 2020/145334 and WO 2020/179123.

The present disclosure was made to solve the above problem, and has an object of providing a vehicle-mounted communication system, a relay device, and a relay method that can improve security in a vehicle-mounted network.

SUMMARY

Technologies that enable the configuration of a vehicle-mounted network to be flexibly changed have been developed.

A vehicle-mounted communication system according to the present disclosure includes: a plurality of vehicle-mounted devices; and a relay device, wherein a first vehicle-mounted device of the vehicle-mounted devices transmits a frame addressed to a second vehicle-mounted device of the vehicle-mounted devices to the relay device, the frame being a frame for transmission and reception of information between the first vehicle-mounted device and the second vehicle-mounted device, and the relay device determines whether or not relay of the frame to the second vehicle-mounted device is permissible based on a result of comparison between a required safety level and a system safety level, the required safety level being a level of safety required for communication between the first vehicle-mounted device and the second vehicle-mounted device, the system safety level being at least based on function safety levels of the first vehicle-mounted device and the second vehicle-mounted device regarding safety of a vehicle.

A relay device according to the present disclosure is a relay device to be used in a vehicle-mounted communication system including a plurality of vehicle-mounted devices, the relay device includes: a setting unit that performs setting relating to permission and prohibition of relay of a frame for transmission and reception of information between the vehicle-mounted devices based on a result of comparison between a required safety level and a system safety level, the required safety level being a level of safety required for communication between the vehicle-mounted devices, the system safety level being at least based on function safety levels of the respective vehicle-mounted devices regarding safety of a vehicle; and a relay unit that performs processing for relaying the frame in accordance with content of the setting performed by the setting unit.

A relay method according to the present disclosure is a relay method performed by a relay device that is used in a vehicle-mounted communication system including a plurality of vehicle-mounted devices, the method includes: a step of performing setting relating to permission and prohibition of relay of a frame for transmission and reception of information between the vehicle-mounted devices based on a result of comparison between a required safety level and a system safety level, the required safety level being a level of safety required for communication between the vehicle-mounted devices, the system safety level being at least based on function safety levels of the respective vehicle-mounted devices regarding safety of a vehicle; and a step of performing processing for relaying the frame in accordance with content of the setting.

An aspect of the present disclosure can be realized not only as the relay device including the characteristic processing units described above but also as a semiconductor integrated circuit that realizes a part or the whole of the relay device, a program for causing a computer to execute processing steps performed by the relay device, a semiconductor integrated circuit that realizes a part or the whole of the vehicle-mounted communication system including the relay device, a relay method including steps of performing processing performed in the vehicle-mounted communication system, or a program for causing a computer to execute the steps of performing processing performed in the vehicle-mounted communication system.

Effects of the Present Disclosure

According to the present disclosure, security of the vehicle-mounted network can be increased.

BRIEF DESCRIPTION OF THE DRAWINGS

FIG. 3 is a diagram showing an example of a system management list that is stored in the storage unit of the relay device according to the embodiment of the present disclosure.

FIG. 4 is a diagram showing an example of a service management list that is stored in the storage unit of the relay device according to the embodiment of the present disclosure.

FIG. 5 is a diagram showing an example of the system management list updated by the updating unit of the relay device according to the embodiment of the present disclosure.

FIG. 6 is a diagram showing an example of the service management list updated by the updating unit of the relay device according to the embodiment of the present disclosure.

DETAILED DESCRIPTION OF PREFERRED EMBODIMENTS

Figure 1:
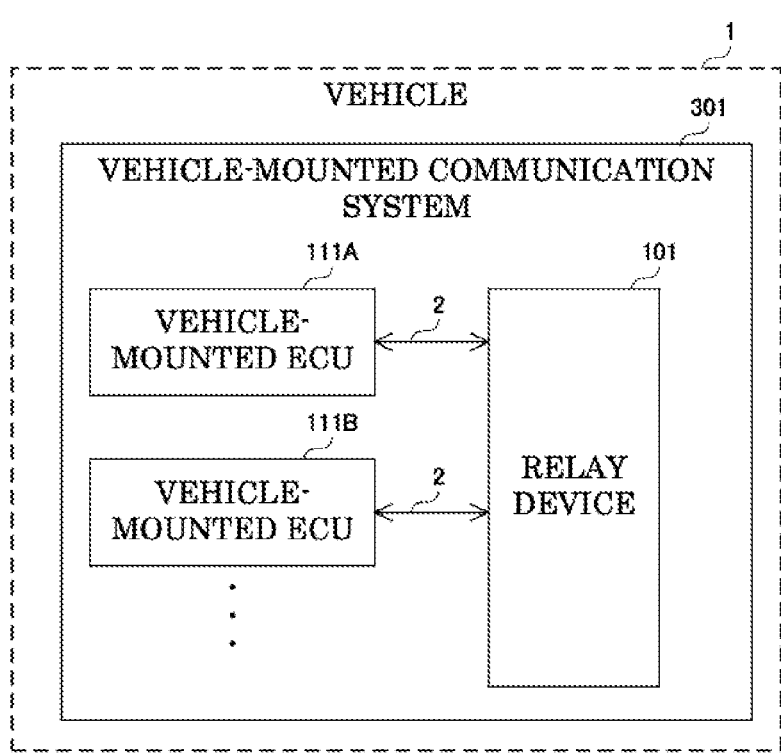
FIG. 1 is a diagram showing the configuration of a vehicle-mounted communication system according to an embodiment of the present disclosure.

First, the details of an embodiment of the present disclosure are listed and described.

A vehicle-mounted communication system according to an embodiment of the present disclosure includes: a plurality of vehicle-mounted devices; and a relay device, wherein a first vehicle-mounted device of the vehicle-mounted devices transmits a frame addressed to a second vehicle-mounted device of the vehicle-mounted devices to the relay device, the frame being a frame for transmission and reception of information between the first vehicle-mounted device and the second vehicle-mounted device, and the relay device determines whether or not relay of the frame to the second vehicle-mounted device is permissible based on a result of comparison between a required safety level and a system safety level, the required safety level being a level of safety required for communication between the first vehicle-mounted device and the second vehicle-mounted device, the system safety level being at least based on function safety levels of the first vehicle-mounted device and the second vehicle-mounted device regarding safety of a vehicle.

With this configuration in which whether or not relay of a frame is permissible is determined based on a result of comparison between a required safety level that is required for communication between vehicle-mounted devices and a system safety level that is based on function safety levels of the respective vehicle-mounted devices, it is possible to determine whether or not relay of the frame is permissible while giving consideration to the required safety level of communication between the vehicle-mounted devices. Therefore, in a case where a high safety level is required for communication between vehicle-mounted devices, for example, it is possible to keep frames from being transmitted between the vehicle-mounted devices. Thus, security of the vehicle-mounted network can be increased.

A configuration is possible in which the relay device determines whether or not relay of the frame to the second vehicle-mounted device is permissible based on a result of comparison between the required safety level and the system safety level that is further based on data for a safety mechanism added to the frame.

With this configuration, it is possible to more appropriately determine whether or not relay of a frame between vehicle-mounted devices is permissible based on the data for a safety mechanism added to the frame, in addition to the function safety levels of the vehicle-mounted devices.

A configuration is possible in which the relay device includes a storage unit in which a system management list showing correspondence between a pair of the vehicle-mounted devices and the system safety level is stored, each of the vehicle-mounted devices notifies the relay device of the function safety level of the vehicle-mounted device, and the relay device updates the system management list stored in the storage unit based on the function safety levels that the relay device is notified of by the vehicle-mounted devices.

With this configuration, it is possible to update a system safety level shown in the system management list stored in the storage unit when the function safety level of a vehicle-mounted device has been changed. Accordingly, even when the function safety level is changed as a result of software of the vehicle-mounted device being updated, it is possible to more appropriately determine whether or not a frame can be relayed between the vehicle-mounted devices based on the system safety level in which the changed function safety level is reflected.

A configuration is possible in which the relay device includes a storage unit in which a service management list showing correspondence between a type of information transmitted between the vehicle-mounted devices and the required safety level is stored, each of the vehicle-mounted devices notifies the relay device of the required safety level required for communication between the vehicle-mounted device and other vehicle-mounted devices included in the vehicle-mounted communication system, and the relay device updates the service management list stored in the storage unit based on the required safety levels that the relay device is notified of by the vehicle-mounted devices.

Even when a new type of information is to be transmitted between vehicle-mounted devices, this configuration makes it possible to appropriately determine whether or not a frame can be relayed between the vehicle-mounted devices based on the required safety levels that the relay device is notified of by the vehicle-mounted devices.

A configuration is possible in which the first vehicle-mounted device transmits the frame in which a message that is in accordance with SOME/IP (Scalable service-Oriented MiddlewarE over IP) is stored to the relay device, and the relay device determines whether or not relay of the frame to the second vehicle-mounted device is permissible based on a result of comparison between the required safety level corresponding to a service ID included in the message and the system safety level.

With this configuration, it is possible to appropriately determine whether or not a frame in which a message that is in accordance with the SOME/IP is stored can be relayed between the vehicle-mounted devices.

A configuration is possible in which, when the relay device has determined not to relay the frame to the second vehicle-mounted device, the relay device notifies the first vehicle-mounted device of a condition that needs to be satisfied to relay the frame to the second vehicle-mounted device.

In a case where it has been determined not to relay a frame between vehicle-mounted devices in view of the required safety level required for communication between the vehicle-mounted devices, this configuration makes it possible to urge the second vehicle-mounted device to retransmit a frame that can be relayed by the relay device.

A relay device according to an embodiment of the present disclosure is a relay device to be used in a vehicle-mounted communication system including a plurality of vehicle-mounted devices, the relay device includes: a setting unit that performs setting relating to permission and prohibition of relay of a frame for transmission and reception of information between the vehicle-mounted devices based on a result of comparison between a required safety level and a system safety level, the required safety level being a level of safety required for communication between the vehicle-mounted devices, the system safety level being at least based on function safety levels of the respective vehicle-mounted devices regarding safety of a vehicle; and a relay unit that performs processing for relaying the frame in accordance with content of the setting performed by the setting unit.

With this configuration in which a setting relating to permission and prohibition of relay of a frame is performed based on a result of comparison between a required safety level that is required for communication between vehicle-mounted devices and a system safety level that is based on function safety levels of the respective vehicle-mounted devices, it is possible to determine whether or not relay of the frame is permissible while giving consideration to the required safety level of communication between the vehicle-mounted devices. Therefore, in a case where a high safety level is required for communication between vehicle-mounted devices, for example, it is possible to keep frames from being transmitted between the vehicle-mounted devices. Thus, security of the vehicle-mounted network can be increased.

A relay method according to an embodiment of the present disclosure is a relay method performed by a relay device that is used in a vehicle-mounted communication system including a plurality of vehicle-mounted devices, the method includes: a step of performing setting relating to permission and prohibition of relay of a frame for transmission and reception of information between the vehicle-mounted devices based on a result of comparison between a required safety level and a system safety level, the required safety level being a level of safety required for communication between the vehicle-mounted devices, the system safety level being at least based on function safety levels of the respective vehicle-mounted devices regarding safety of a vehicle; and a step of performing processing for relaying the frame in accordance with content of the setting.

With this method in which a setting relating to permission and prohibition of relay of a frame is performed based on a result of comparison between a required safety level that is required for communication between vehicle-mounted devices and a system safety level that is based on function safety levels of the respective vehicle-mounted devices, it is possible to determine whether or not relay of the frame is permissible while giving consideration to the required safety level of communication between the vehicle-mounted devices. Therefore, in a case where a high safety level is required for communication between vehicle-mounted devices, for example, it is possible to keep frames from being transmitted between the vehicle-mounted devices. Thus, security of the vehicle-mounted network can be increased.

Hereinafter, embodiments of the present invention will be described with reference to the drawings. Note that, in the drawings, the same reference numerals are given to the same or corresponding components in the drawings, and redundant descriptions thereof are not repeated. Furthermore, at least parts of the embodiments described below may be suitably combined.

FIG. 1 is a diagram showing the configuration of a vehicle-mounted communication system according to an embodiment of the present disclosure. As shown in FIG. 1, the vehicle-mounted communication system 301 includes a relay device 101 and a plurality of vehicle-mounted ECUs 111. For example, the vehicle-mounted communication system 301 includes vehicle-mounted ECUs 111A and 111B as the vehicle-mounted ECUs 111. The vehicle-mounted communication system 301 may include two vehicle-mounted ECUs 111 or three or more vehicle-mounted ECUs 111. The vehicle-mounted ECUs 111 are examples of vehicle-mounted devices. The vehicle-mounted communication system 301 is mounted in a vehicle 1.

The relay device 101 is used for the vehicle-mounted communication system 301. The relay device 101 is connected to each of the vehicle-mounted ECUs 111 via a cable 2. The cables 2 are cables in accordance with the standards of Ethernet (registered trademark). The relay device 101 and the vehicle-mounted ECUs 111 constitute a vehicle-mounted network.

Examples of the vehicle-mounted ECUs 111 include an electric power steering (EPS), a brake control device, an accelerator control device, a steering control device, a driving support device that gives instructions to various devices included in an advanced driver-assistance system (ADAS), a sensor, and the like.

The relay device 101 is capable of communicating with the vehicle-mounted ECUs 111. The relay device 101 performs relay processing of relaying information transmitted between a plurality of vehicle-mounted ECUs 111 connected to different cables 2, for example.

For example, each of the vehicle-mounted ECUs 111 regularly generates an LLDP frame that is a frame in accordance with the LLDP (Link Layer Discovery Protocol), and transmits the generated LLDP frame that includes a MAC address and an IP address of the vehicle-mounted ECU 111 to the relay device 101.

The relay device 101 receives the LLDP frame from the vehicle-mounted ECU 111, and obtains various types of information such as the MAC address and the IP address of the vehicle-mounted ECU 111 connected to the relay device 101 from the received LLDP frame. The following describes a case where the MAC address of the vehicle-mounted ECU 111A is "MAC_A" and the MAC address of the vehicle-mounted ECU 111B is "MAC_B".

In the vehicle-mounted communication system 301, messages are transmitted and received in accordance with the SOME/IP that is a protocol of an application layer of an Ethernet protocol group, for example. More specifically, the vehicle-mounted ECUs 111 are capable of storing messages including various types of information in one or more frames, and transmitting the frames to other vehicle-mounted ECUs 111 via the relay device 101 in accordance with the SOME/IP.

In the following description, a vehicle-mounted ECU 111 that provides a service in accordance with the SOME/IP will also be referred to as a "server". Also, a vehicle-mounted ECU 111 to which the service is provided will also be referred to as a "client". Each of the vehicle-mounted ECUs 111 may function only as a server or a client, or may function as a server or a client according to the content of a service. In the example described below, the vehicle-mounted ECU 111A is a server, and the vehicle-mounted ECU 111B is a client.

When the vehicle-mounted ECU 111B, which is a client, wants to use a service, for example, the vehicle-mounted ECU 111B generates a service search message that includes a service ID corresponding to the service. The vehicle-mounted ECU 111B transmits a frame F1 in which the generated service search message is stored to the relay device 101. The relay device 101 multicasts the frame F1 received from the vehicle-mounted ECU 111B to other vehicle-mounted ECUs such as the vehicle-mounted ECU 111A.

Out of the vehicle-mounted ECUs 111 that have received the service search message, a vehicle-mounted ECU 111, such as the vehicle-mounted ECU 111A, that can provide the service corresponding to the service ID included in the service search message serves as a server and generates a service provision notification message that includes the service ID corresponding to the service. The vehicle-mounted ECU 111A transmits a frame F2 in which the generated service provision notification message is stored to the relay device 101. The relay device 101 transmits the frame F2 received from the vehicle-mounted ECU 111A to the vehicle-mounted ECU 111B from which the frame F1 was transmitted. Thus, a connection for communication can be established between the vehicle-mounted ECUs 111A and 111B.

In a case where the vehicle-mounted ECU 111B, which has established the connection for communication with the vehicle-mounted ECU 111A, requests periodic provision of the service from the vehicle-mounted ECU 111A, the vehicle-mounted ECU 111B generates a service subscription request message that includes the service ID corresponding to the service. The vehicle-mounted ECU 111B transmits a frame F3 in which the generated service subscription request message is stored to the relay device 101. The relay device 101 transmits the frame F3 received from the vehicle-mounted ECU 111B to the vehicle-mounted ECU 111A.

Upon receiving the service subscription request message, the vehicle-mounted ECU 111A determines whether or not to permit provision of the service based on the ID of the vehicle-mounted ECU 111B included in the received service subscription request message, for example. When the vehicle-mounted ECU 111A has determined to permit provision of the service, the vehicle-mounted ECU 111A generates a service subscription permission message that includes the service ID corresponding to the service. The vehicle-mounted ECU 111A transmits a frame F4 in which the generated service subscription permission message is stored to the relay device 101. The relay device 101 transmits the frame F4 received from the vehicle-mounted ECU 111A to the vehicle-mounted ECU 111B.

Then, the vehicle-mounted ECU 111A periodically generates a service provision message that includes information to be provided as the service and the service ID corresponding to the service, and transmits a frame F5 in which the generated service provision message is stored to the relay device 101. The relay device 101 transmits the frame F5 received from the vehicle-mounted ECU 111A to the vehicle-mounted ECU 111B. In an example, the vehicle-mounted ECU 111A that is a sensor transmits a service provision message that includes sensor information regarding a travel state of the vehicle 1 or the state of a surrounding environment to the vehicle-mounted ECU 111B that is a driving support device. The vehicle-mounted ECU 111B obtains the sensor information provided as the service from the received service provision message, generates various types of control information regarding driving of the vehicle 1 with use of the sensor information, and transmits the generated various types of control information to a brake control device and a steering control device, for example.

The service search message, the service provision notification message, the service subscription request message, the service subscription permission message, and the service provision message are examples of a message that is in accordance with the SOME/IP. Frames F1, F2, F3, F4, and F5 are examples of a frame for transmission and reception of information between a server and a client.

A function safety level "A", "B", "C", or "D" is allocated to each of the vehicle-mounted ECUs 111 according to the function of the vehicle-mounted ECU 111. Safety measures of the highest level are required for functions to which "D" is allocated, and safety measures of the lowest level are required for functions to which "A" is allocated. That is, the function safety levels of the vehicle-mounted ECUs 111 are high in the order of "D", "C", "B", and "A".

For example, the function safety levels are ASILs (Automotive Safety Integrity Levels) defined in ISO26262.

Note that a vehicle-mounted ECU 111 may have a plurality of functions. In such a case, the vehicle-mounted ECU 111 has a plurality of function safety levels for the respective functions.

Incidentally, there is a case where the configuration of the vehicle-mounted network is changed in the vehicle-mounted communication system 301, and consequently, a vehicle-mounted ECU 111 that performed only communication of which the required safety level is low before the change communicates with a vehicle-mounted ECU 111 that performed only communication of which the required safety level is high before the change.

In a specific example, the function safety level of a vehicle-mounted ECU 111 may be changed from "B" to "D" as a result of software of the vehicle-mounted ECU 111 being updated based on update data received from an OTA (Over The Air) server outside the vehicle 1. In this case, communication may be newly started between the vehicle-mounted ECU 111 and another vehicle-mounted ECU 111 of which the function safety level is "D".

In another example, a new vehicle-mounted ECU 111 may be added to the vehicle-mounted network. Communication may be newly started between the vehicle-mounted ECU 111 and an existing vehicle-mounted ECU 111 that performed only communication of which the required safety level is high.

Conventionally, there has been concern from the viewpoint of security in such cases where a vehicle-mounted ECU 111 that performed only communication of which the required safety level is low starts communication of which the required safety level is high.

Therefore, the vehicle-mounted communication system 301 and the relay device 101 according to the present disclosure solve this problem with the configuration and operations described below.

Figure 2:
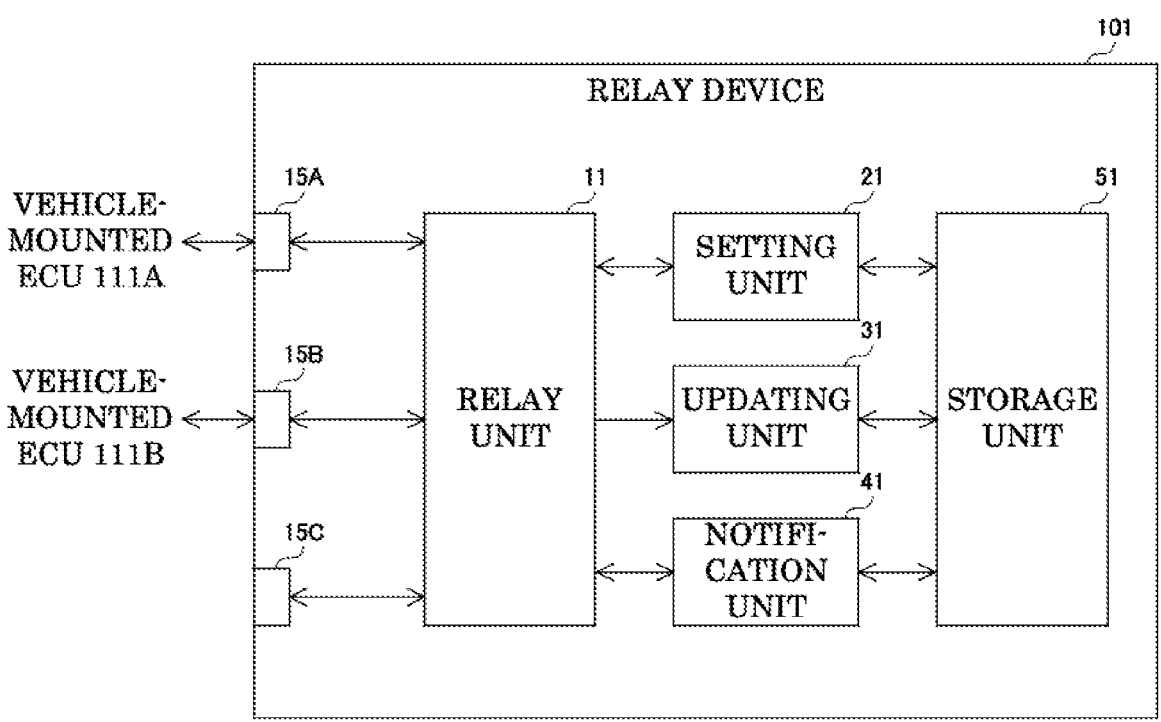
FIG. 2 is a diagram showing the configuration of a relay device according to the embodiment of the present disclosure.

FIG. 2 is a diagram showing the configuration of a relay device according to the embodiment of the present disclosure. As shown in FIG. 2, the relay device 101 includes communication ports 15A, 15B, and 15C, a relay unit 11, a setting unit 21, an updating unit 31, a notification unit 41, and a storage unit 51. Hereinafter, each of the communication ports 15A, 15B, and 15C will also be referred to as a "communication port 15". Note that the relay device 101 may include two communication ports 15 or four or more communication ports 15.

The relay unit 11 is realized by a switch IC (Integrated Circuit), for example. The setting unit 21, the updating unit 31, and the notification unit 41 are realized by processors such as a CPU (Central Processing Unit) and a DSP (Digital Signal Processor). The storage unit 51 is a non-volatile memory, for example.

The communication ports 15 are terminals to which the cables 2 are connectable. Note that the communication ports 15 may be terminals of an integrated circuit. The communication port 15A is connected to the vehicle-mounted ECU 111A via a cable 2. The communication port 15B is connected to the vehicle-mounted ECU 111B via a cable 2.

The relay unit 11 is capable of relaying a frame received from a vehicle-mounted ECU 111 to other vehicle-mounted ECUs 111. That is, the relay unit 11 is capable of receiving a frame transmitted from a vehicle-mounted ECU 111 via a communication port 15 corresponding to the vehicle-mounted ECU 111, and performing relay processing on the received frame.

An address table that shows correspondence between port numbers of the communication ports 15 and MAC (Media Access Control) addresses of the vehicle-mounted ECUs 111 connected via the cables 2 to the communication ports 15 is stored in the storage unit 51, for example. The relay unit 11 performs the relay processing with use of the address table stored in the storage unit 51.

FIG. 3 is a diagram showing an example of a system management list that is stored in the storage unit of the relay device according to the embodiment of the present disclosure. As shown in FIG. 3, a system management list Lsy that shows correspondence between pairs of vehicle-mounted ECUs 111 and system safety levels is stored in the storage unit 51. More specifically, the system management list Lsy shows correspondence between system IDs of communication systems each including two vehicle-mounted ECUs 111 as constitutional elements and system safety levels of the respective communication systems. System safety levels of the communication systems are high in the order of "D", "C", "B", and "A", similarly to the function safety levels of the vehicle-mounted ECUs 111.

The system safety level of a communication system is set at least based on the function safety levels of the two vehicle-mounted ECUs 111 constituting the communication system. For example, the system safety level of a communication system is set further based on data for a safety mechanism that is added to frames transmitted between the vehicle-mounted ECUs 111 constituting the communication system.

More specifically, the vehicle-mounted ECU 111A includes ECC (Error Correction Code) or the like as a safety mechanism, and the function safety level of the vehicle-mounted ECU 111A is "B". Also, the vehicle-mounted ECU 111B includes ECC or the like as a safety mechanism, and the function safety level of the vehicle-mounted ECU 111B is "C". The system safety level of a communication system that has a system ID "S001" is set to "B" based on the respective function safety levels of the vehicle-mounted ECUs 111A and 111B constituting the communication system.

Also, the system safety level of a communication system that has a system ID "S002" is set to "C" based on the respective function safety levels of the vehicle-mounted ECUs 111A and 111B constituting the communication system and CRC (Cyclic Redundancy Check) that is added as data for a safety mechanism to frames transmitted between the vehicle-mounted ECUs 111A and 111B.

FIG. 4 is a diagram showing an example of a service management list that is stored in the storage unit of the relay device according to the embodiment of the present disclosure. As shown in FIG. 4, a service management list Lse that shows corresponding between types of information transmitted between vehicle-mounted ECUs 111 and required safety levels that are safety levels required for communication between the vehicle-mounted ECUs 111 is stored in the storage unit 51. More specifically, the service management list Lse shows correspondence between the service ID of each service that is in accordance with the SOME/IP and a required safety level that is required for communication performed between vehicle-mounted ECUs 111 to provide the service. Required safety levels are high in the order of "D", "C", "B", and "A", similarly to the function safety levels of the vehicle-mounted ECUs 111.

For example, the required safety level corresponding to a service having a service ID "2001" is "D", and therefore, safety measures of the highest level are required for communication performed between vehicle-mounted ECUs 111 to provide the service.

The system management list Lsy and the service management list Lse are created by a manufacturer of the vehicle 1 and saved in the storage unit 51 at the time of shipment of the vehicle 1, for example.

Each vehicle-mounted ECU 111 notifies the relay device 101 of the function safety level of the vehicle-mounted ECU 111. More specifically, each vehicle-mounted ECU 111 transmits level information L1 indicating the current function safety level of the vehicle-mounted ECU 111 to the relay device 101 by including the level information L1 in the LLDP frame described above, for example.

For example, the function safety level of the vehicle-mounted ECU 111A is changed from "B" to "C" as a result of software of the vehicle-mounted ECU 111A being updated based on update data received from the OTAserver. The vehicle-mounted ECU 111A transmits level information L1 indicating the updated function safety level of the vehicle-mounted ECU 111A to the relay device 101 by including the level information L1 in the LLDP frame.

In another example, a vehicle-mounted ECU 111C that is a new vehicle-mounted ECU 111 is added to the vehicle-mounted network. More specifically, the vehicle-mounted ECU 111C is connected via a cable 2 to the communication port 15C of the relay device 101 through an operation performed by a user of the vehicle 1. The vehicle-mounted ECU 111C transmits an LLDP frame that includes a MAC address and an IP address of the vehicle-mounted ECU 111C and level information L1 indicating the current function safety level of the vehicle-mounted ECU 111C to the relay device 101. In the following description, the MAC address of the vehicle-mounted ECU 111C is denoted by "MAC_C".

Upon receiving an LLDP frame from a vehicle-mounted ECU 111 via a corresponding communication port 15, the relay unit 11 obtains level information L1 from the received LLDP frame and outputs the level information L1 to the updating unit 31.

The updating unit 31 updates the system management list Lsy stored in the storage unit 51 based on the function safety level that the updating unit 31 is notified of by the vehicle-mounted ECU 111. More specifically, upon receiving the level information L1 from the relay unit 11, the updating unit 31 updates the system management list Lsy stored in the storage unit 51 based on the received level information L1.

FIG. 5 is a diagram showing an example of the system management list updated by the updating unit of the relay device according to the embodiment of the present disclosure.

Upon receiving level information L1 from the vehicle-mounted ECU 111A via the relay unit 11, the updating unit 31 changes the function safety level of the vehicle-mounted ECU 111A from "B" to "C" in the system management list Lsy stored in the storage unit 51 as shown in FIG. 5. Also, the updating unit 31 changes the system safety level of the communication system having the system ID "S001" from "B" to "C" along with the change of the function safety level of the vehicle-mounted ECU 111A. Also, the updating unit 31 changes the system safety level of the communication system having the system ID "S002" from "C" to "D" along with the change of the function safety level of the vehicle-mounted ECU 111A.

Also, upon receiving level information L1 from the vehicle-mounted ECU 111C via the relay unit 11, the updating unit 31 adds "S103", which is the system ID of a new communication system including the vehicle-mounted ECUs 111A and 111C as constitutional elements, to the system management list Lsy stored in the storage unit 51, and sets the system safety level of the communication system to "B", for example, based on the respective function safety levels of the vehicle-mounted ECUs 111A and 111C.

Each vehicle-mounted ECU 111 notifies the relay device 101 of a required safety level that is required for communication between the vehicle-mounted ECU 111 and other vehicle-mounted ECUs 111. More specifically, each vehicle-mounted ECU 111 transmits level information L2 to the relay device 101 by including the level information L2 in a frame F1 in which a service search message is stored, for example. The level information L2 indicates a required safety level that is required for communication relating to a service that is indicated by a service ID included in the service search message.

For example, the vehicle-mounted ECU 111B transmits level information L2 to the relay device 101 by including the level information L2 in a frame F1 in which a service search message including "3001" as the service ID is stored. The level information L2 indicates that the required safety level required for communication for the service indicated by the service ID is "D".

Upon receiving the frame F1 from the vehicle-mounted ECU 111 via the corresponding communication port 15, the relay unit 11 obtains the level information L2 from the received frame F1 and outputs the level information L2 to the updating unit 31.

The updating unit 31 updates the service management list Lse stored in the storage unit 51 based on the required safety level that the updating unit 31 is notified of by the vehicle-mounted ECU 111. More specifically, upon receiving the level information L2 from the relay unit 11, the updating unit 31 updates the service management list Lse stored in the storage unit 51 based on the received level information L2.

FIG. 6 is a diagram showing an example of the service management list updated by the updating unit of the relay device according to the embodiment of the present disclosure.

Upon receiving level information L2 from a vehicle-mounted ECU 111 via the relay unit 11, the updating unit 31 adds "3001", which is a service ID, to the service management list Lse stored in the storage unit 51 as shown in FIG. 6. Then, the updating unit 31 sets the required safety level corresponding to the service indicated by "3001" to "D" based on the level information L2.

The setting unit 21 performs setting relating to permission and prohibition of relay performed by the relay unit 11 based on a result of comparison between a required safety level and a system safety level.

For example, upon receiving a frame F1 in which a service search message is stored from the vehicle-mounted ECU 111B via the communication port 15B, the relay unit 11 obtains the service search message from the received frame F1 and outputs the service search message to the setting unit 21. Then, the relay unit 11 multicasts the frame F1 via the plurality of communication ports 15.

Upon receiving the service search message from the relay unit 11, the setting unit 21 obtains the service ID from the received service search message. The setting unit 21 performs setting relating to permission and prohibition of relay performed by the relay unit 11 with use of the obtained service ID.

More specifically, the setting unit 21 obtains a required safety level corresponding to the obtained service ID from the service management list Lse stored in the storage unit 51. Then, based on the system management list Lsy stored in the storage unit 51, the setting unit 21 sets relay processing conditions for permitting relay of a frame in which a message including the service ID is stored and that is transmitted and received in a communication system having a system safety level higher than or equal to the obtained required safety level and prohibiting relay of a frame in which a message including the service ID is stored and that is transmitted and received in a communication system having a system safety level lower than the obtained required safety level.

For example, when the service ID obtained from the service search message is "2001", the setting unit 21 obtains "D", which is the required safety level corresponding to "2001", from the service management list Lse stored in the storage unit 51.

Then, based on the system management list Lsy stored in the storage unit 51, the setting unit 21 sets relay processing conditions for permitting relay of a frame in which a message including "2001" as a service ID is stored and that is transmitted and received in a communication system having a system safety level higher than or equal to "D" and prohibiting relay of a frame in which a message including "2001" as a service ID is stored and that is transmitted and received in a communication system having a system safety level lower than "D".

That is, the setting unit 21 sets relay processing conditions for permitting relay of a frame in which a message including "2001" as a service ID is stored and that is transmitted and received in the communication system of which the system ID is "S002" and prohibiting relay of a frame in which a message including "2001" as a service ID is stored and that is transmitted and received in the communication systems of which the system IDs are "S001" and "S103".

The relay unit 11 includes an ACL (Access Control List), for example.

The setting unit 21 sets, in the ACL included in the relay unit 11, relay processing conditions for relaying a frame in which a message including "2001" as a service ID is stored if the frame satisfies conditions that the MAC address of the destination of the frame is "MAC_A" or "MAC_B"; the MAC address of the transmission source of the frame is "MAC_A" or "MAC_B"; and the frame includes CRC, and not relaying the frame if the frame does not satisfy these conditions.

The relay unit 11 determines whether or not relay of frames F2, F3, F4, and F5 is permissible based on the result of comparison between a required safety level and a system safety level performed by the setting unit 21. That is, the relay unit 11 performs processing for relaying the frames F2, F3, F4, and F5 in accordance with content of the setting performed by the setting unit 21.

More specifically, for example, the relay unit 11 receives a frame F2 via the communication port 15A from the vehicle-mounted ECU 111A. A service provision notification message that includes "2001" as the service ID is stored in the frame F2, the destination MAC address of the frame F2 is "MAC_B", the transmission source MAC address of the frame F2 is "MAC_A", and the frame F2 includes CRC. In this case, the received frame F2 satisfies the relay processing conditions described above, and therefore, the relay unit 11 performs processing for relaying the frame F2. Specifically, the relay unit 11 transmits the frame F2 to the vehicle-mounted ECU 111B via the communication port 15B.

Next, for example, the relay unit 11 receives a frame F3 via the communication port 15B from the vehicle-mounted ECU 111B. A service subscription request message that includes "2001" as the service ID is stored in the frame F3, the destination MAC address of the frame F3 is "MAC_A", the transmission source MAC address of the frame F3 is "MAC_B", and the frame F3 includes CRC. In this case, the received frame F3 satisfies the relay processing conditions described above, and therefore, the relay unit 11 performs processing for relaying the frame F3. Specifically, the relay unit 11 transmits the frame F3 to the vehicle-mounted ECU 111A via the communication port 15A.

In another example, the relay unit 11 receives a frame F3 via the communication port 15B from the vehicle-mounted ECU 111B. A service subscription request message that includes "2001" as the service ID is stored in the frame F3, the destination MAC address of the frame F3 is "MAC_A", the transmission source MAC address of the frame F3 is "MAC_B", and the frame F3 does not include CRC. In this case, the received frame F3 does not satisfy the relay processing conditions described above, and therefore, the relay unit 11 does not perform processing for relaying the frame F3.

In another example, the relay unit 11 receives a frame F2 via the communication port 15 from the vehicle-mounted ECU 111A. A service provision notification message that includes "2001" as the service ID is stored in the frame F2, the destination MAC address of the frame F2 is "MAC_C", the transmission source MAC address of the frame F2 is "MAC_A", and the frame F2 includes CRC. In this case, the received frame F2 does not satisfy the relay processing conditions described above, and therefore, the relay unit 11 does not perform processing for relaying the frame F2.

As for each of the frames F4 and F5 too, if the received frame satisfies the relay processing conditions, the relay unit 11 transmits the frame to a vehicle-mounted ECU 111 that is the destination via a corresponding communication port 15, but if the received frame does not satisfy the relay processing conditions, the relay unit 11 does not perform processing for relaying the frame F2.

For example, the relay unit 11 outputs a frame that does not satisfy the relay processing conditions to the notification unit 41.

When the relay unit 11 has determined not to relay a frame, the notification unit 41 notifies a vehicle-mounted ECU 111 that is the transmission source of the frame of conditions that need to be satisfied to relay the frame to a vehicle-mounted ECU 111 that is the destination of the frame.

More specifically, the notification unit 41 receives, from the relay unit 11, a frame F3 in which a service subscription request message including "2001" as the service ID is stored, of which the destination MAC is "MAC_A" and the transmission source MAC address is "MAC_B", and that does not include CRC.

The notification unit 41 refers to the system management list Lsy and the service management list Lse stored in the storage unit 51 and recognizes that, if the frame F3 includes CRC, the system safety level of the communication system changes to "D" and becomes higher than or equal to the required safety level.

Then, the notification unit 41 generates relay condition information indicating that CRC should be included in the frame F3, as a condition that needs to be satisfied to relay the frame F3 to the vehicle-mounted ECU 111A, generates a frame including the generated relay condition information and addressed to the vehicle-mounted ECU 111B, and transmits the generated frame via the relay unit 11 and the communication port 15B to the vehicle-mounted ECU 111B.

The vehicle-mounted ECU 111B receives the frame from the relay device 101, and obtains the relay condition information from the received frame. For example, the vehicle-mounted ECU 111B again transmits the frame F3 that includes CRC in accordance with the obtained relay condition information.

The devices in the vehicle-mounted communication system according to an embodiment of the present disclosure each have a computer that includes a memory, and in each of such devices, an arithmetic processing unit such as a CPU in the computer reads out, from the memory, a program that includes part or all of the steps of the sequence described below, and executes the program. The programs executed by the devices can be installed from an external source. The programs executed by the devices are distributed in a state of being stored in recording media or distributed via a communication line.

Figure 7:
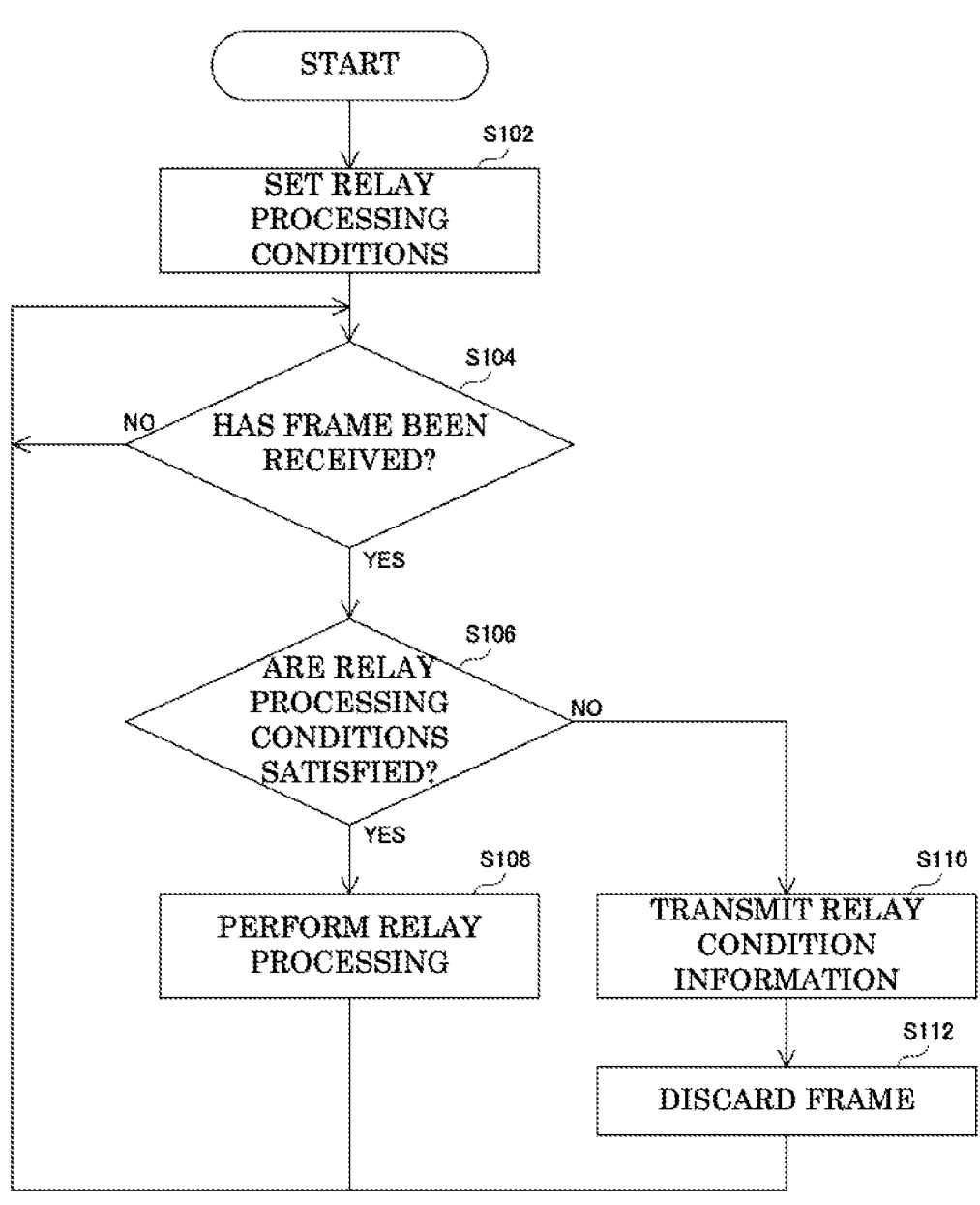
FIG. 7 is a flowchart showing an example procedure of operations performed by the relay device according to the embodiment of the present disclosure when performing relay processing.

FIG. 7 is a flowchart showing an example procedure of operations performed by the relay device according to the embodiment of the present disclosure when performing relay processing.

As shown in FIG. 7, first, the relay device 101 sets relay processing conditions. More specifically, the relay device 101 obtains a service search message from a frame F1 received from the vehicle-mounted ECU 111B via the communication port 15B. The relay device 101 obtains a service ID from the service search message, and obtains a required safety level corresponding to the service ID from the service management list Lse stored in the storage unit 51. Then, based on the system management list Lsy stored in the storage unit 51, the setting unit 21 sets relay processing conditions for permitting relay of a frame in which a message including the service ID is stored and that is transmitted and received in a communication system having a system safety level higher than or equal to the obtained required safety level and prohibiting relay of a frame in which a message including the service ID is stored and that is transmitted and received in a communication system having a system safety level lower than the obtained required safety level (step S102).

Next, the relay device 101 waits for frames F2, F3, F4, and F5 (NO in step S104), and upon receiving a frame F2 from the vehicle-mounted ECU 111A via the communication port 15A, for example (YES in step S104), determines whether or not the received frame F2 satisfies the relay processing conditions (step S106).

If the received frame F2 satisfies the relay processing conditions, the relay device 101 performs processing for relaying the frame F2 (step S108).

Next, the relay device 101 waits for new frames F2, F3, F4, and F5 (NO in step S104).

On the other hand, if the received frame F2 does not satisfy the relay processing conditions, the relay device 101 generates relay condition information, generates a frame including the generated relay condition information, and transmits the frame to the vehicle-mounted ECU 111A (step S110).

Next, the relay device 101 discards the frame F2 (step S112).

Next, the relay device 101 waits for new frames F2, F3, F4, and F5 (NO in step S104).

Figure 8:
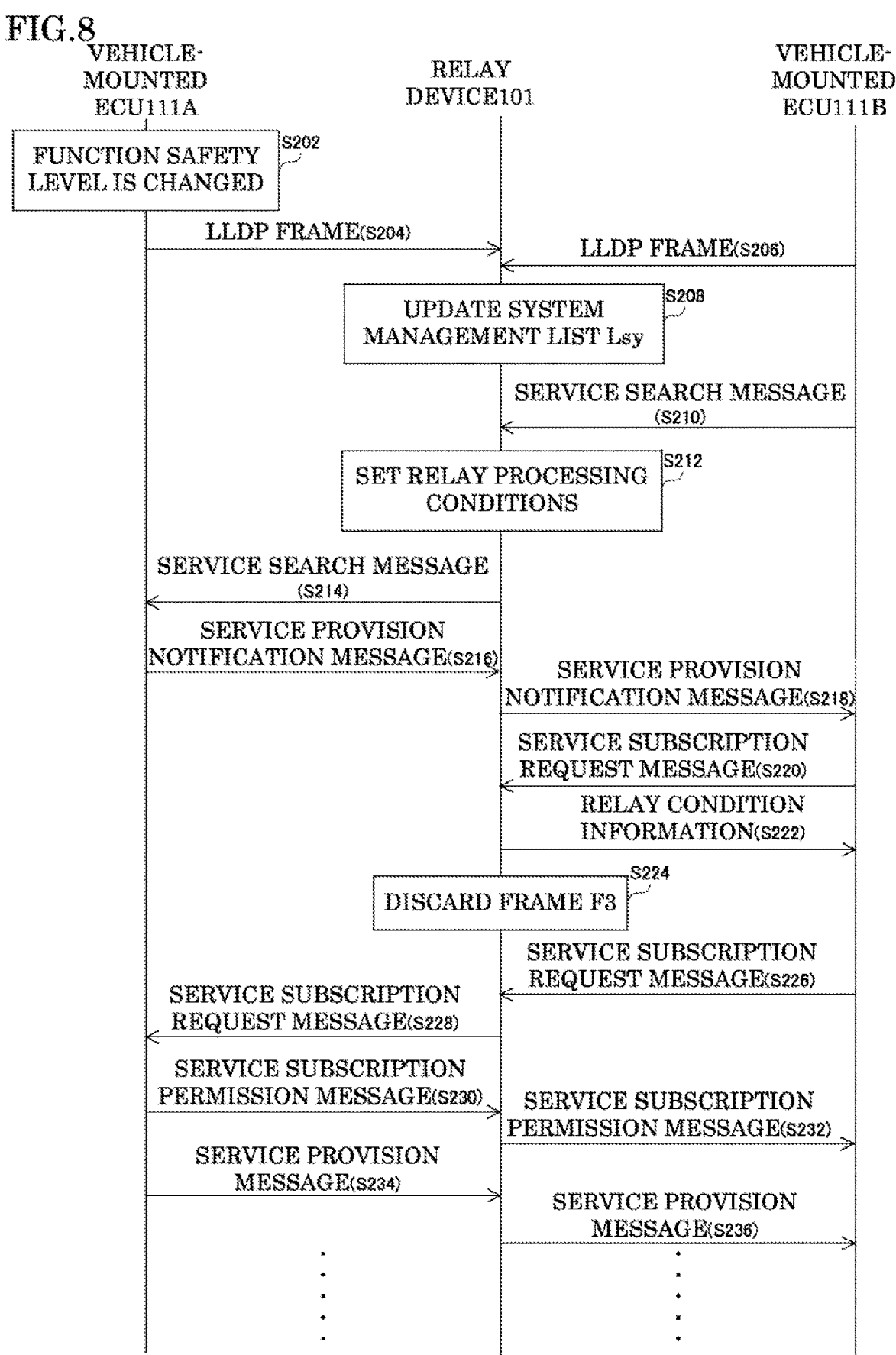
FIG. 8 is a diagram showing an example of a communication sequence in the vehicle-mounted communication system according to the embodiment of the present disclosure.

FIG. 8 is a diagram showing an example of a communication sequence in the vehicle-mounted communication system according to the embodiment of the present disclosure. FIG. 8 shows a sequence of transmission and reception of frames by the vehicle-mounted ECU 111A, which is a server, and the vehicle-mounted ECU 111B, which is a client, via the relay device 101.

As shown in FIG. 8, first, the function safety level of the vehicle-mounted ECU 111A is changed as a result of software of the vehicle-mounted ECU 111A being updated based on update data received from an OTA server (step S202).

Next, the vehicle-mounted ECU 111A transmits level information L1 that indicates the current function safety level of the vehicle-mounted ECU 111A to the relay device 101 by including the level information L1 in an LLDP frame (step S204).

Also, the vehicle-mounted ECU 111B transmits level information L1 that indicates the current function safety level of the vehicle-mounted ECU 111B to the relay device 101 by including the level information L1 in an LLDP frame (step S206).

Next, the relay device 101 updates the system management list Lsy stored in the storage unit 51 based on the level information L1 received from each of the vehicle-mounted ECUs 111A and 111B (step S208).

Next, the vehicle-mounted ECU 111B transmits a frame F1 in which a service search message is stored to the relay device 101 (step S210).

Next, the relay device 101 obtains a service ID from the service search message stored in the received frame F1, and obtains a required safety level corresponding to the service ID from the service management list Lse stored in the storage unit 51. Then, the relay device 101 sets relay processing conditions based on the obtained required safety level and the system management list Lsy stored in the storage unit 51 (step S212).

Next, the relay device 101 transmits the frame F1 in which the service search message is stored to the vehicle-mounted ECU 111A. Specifically, the relay device 101 multicasts the frame F1 (step S214).

Next, the vehicle-mounted ECU 111A transmits a frame F2 in which a service provision notification message is stored to the relay device 101 (step S216).

Next, the relay device 101 performs processing for relaying the frame F2 because the received frame F2 satisfies the set relay processing conditions. Specifically, the relay device 101 transmits the frame F2 in which the service provision notification message is stored to the vehicle-mounted ECU 111B (step S218).

Next, the vehicle-mounted ECU 111B transmits a frame F3 in which a service subscription request message is stored to the relay device 101 (step S220).

Next, the relay device 101 transmits a frame that includes relay condition information to the vehicle-mounted ECU 111B instead of performing processing for relaying the frame F3 because CRC is not included in the frame F3 and therefore the frame F3 does not satisfy the relay processing conditions (step S222).

Next, the relay device 101 discards the frame F3 (step S224).

Next, the vehicle-mounted ECU 111B transmits, to the relay device 101, a frame F3 in which a service subscription request message is stored and CRC is included in accordance with the relay condition information obtained from the frame received from the relay device 101 (step S226).

Next, the relay device 101 performs processing for relaying the frame F3 because the received frame F3 includes CRC and satisfies the relay processing conditions. Specifically, the relay device 101 transmits the frame F3 in which the service subscription request message is stored to the vehicle-mounted ECU 111A (step S228).

Next, the vehicle-mounted ECU 111A transmits a frame F4 in which a service subscription permission message is stored to the relay device 101 (step S230).

Next, the relay device 101 performs processing for relaying the frame F4 because the received frame F4 satisfies the set relay processing conditions. Specifically, the relay device 101 transmits the frame F4 in which the service subscription permission message is stored to the vehicle-mounted ECU 111B (step S232).

Next, the vehicle-mounted ECU 111A transmits a frame F5 in which a service provision message is stored to the relay device 101 (step S234).

Next, the relay device 101 performs processing for relaying the frame F5 because the received frame F5 satisfies the set relay processing conditions. Specifically, the relay device 101 transmits the frame F5 in which the service provision message is stored to the vehicle-mounted ECU 111B (step S236).

Figure 9:
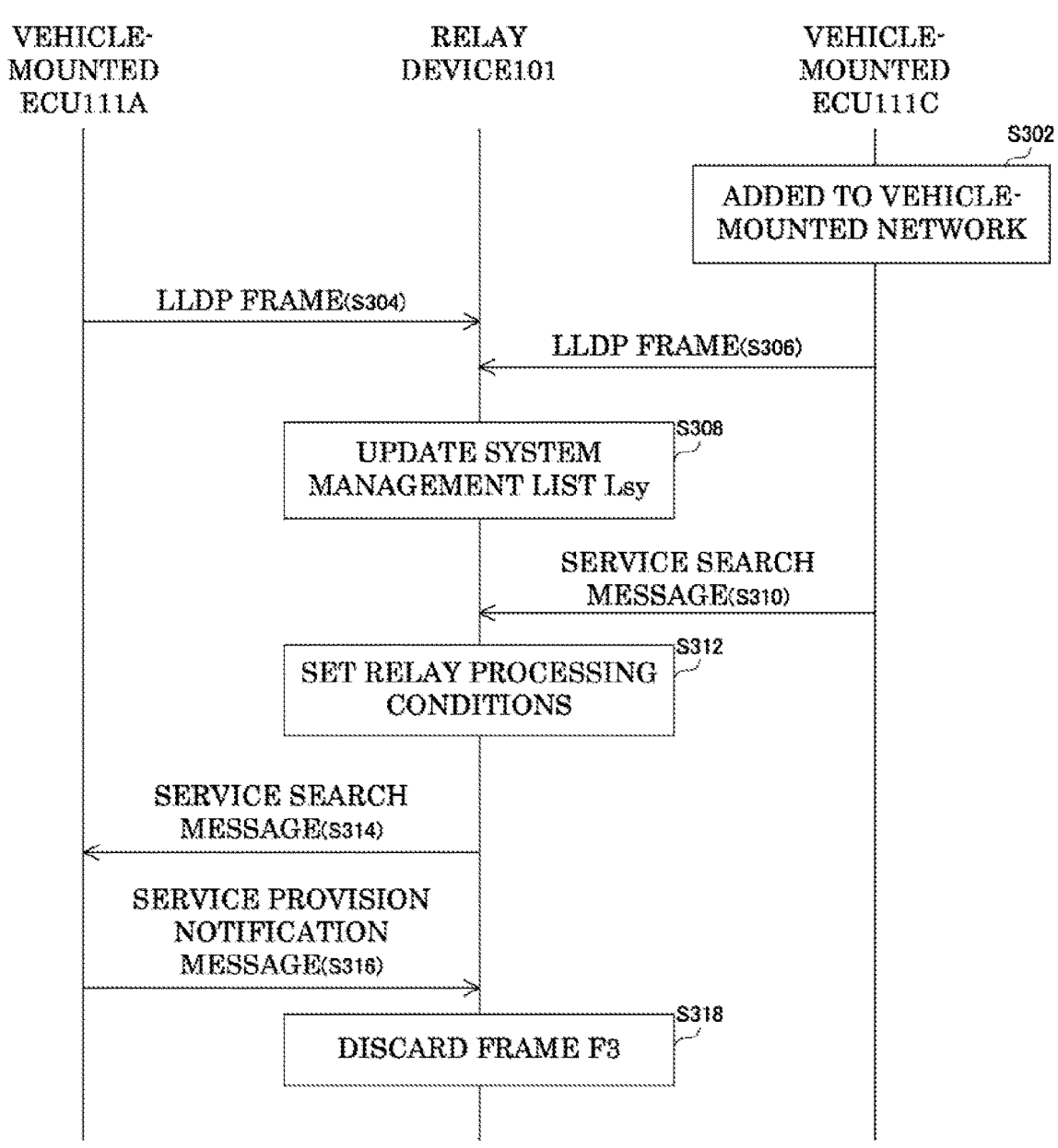
FIG. 9 is a diagram showing another example of a communication sequence in the vehicle-mounted communication system according to the embodiment of the present disclosure.

FIG. 9 is a diagram showing another example of a communication sequence in the vehicle-mounted communication system according to the embodiment of the present disclosure. FIG. 9 shows a sequence of transmission and reception of frames by the vehicle-mounted ECU 111A, which is a server, and the vehicle-mounted ECU 111C, which is a client, via the relay device 101.

As shown in FIG. 9, first, a new vehicle-mounted ECU 111C is added to the vehicle-mounted network (step S302).

Next, the vehicle-mounted ECU 111A transmits level information L1 that indicates the current function safety level of the vehicle-mounted ECU 111A to the relay device 101 by including the level information L1 in an LLDP frame (step S304).

Also, the vehicle-mounted ECU 111C transmits level information L1 that indicates the current function safety level of the vehicle-mounted ECU 111C to the relay device 101 by including the level information L1 in an LLDP frame (step S306).

Next, the relay device 101 updates the system management list Lsy stored in the storage unit 51 based on the level information L1 received from each of the vehicle-mounted ECUs 111A and 111C (step S308).

Next, the vehicle-mounted ECU 111C transmits a frame F1 in which a service search message is stored to the relay device 101 (step S310).

Next, the relay device 101 obtains a service ID from the service search message stored in the received frame F1, and obtains a required safety level corresponding to the service ID from the service management list Lse stored in the storage unit 51. Then, the relay device 101 sets relay processing conditions based on the obtained required safety level and the system management list Lsy stored in the storage unit 51 (step S312).

Next, the relay device 101 transmits the frame F1 in which the service search message is stored to the vehicle-mounted ECU 111A. Specifically, the relay device 101 multicasts the frame F1 (step S314).

Next, the vehicle-mounted ECU 111A transmits a frame F2 in which a service provision notification message is stored to the relay device 101 (step S316).

Next, the relay device 101 discards the frame F3 because the destination MAC address of the frame F3 is "MAC_C", for example, and therefore the frame F3 does not satisfy the relay processing conditions (step S318).

Note that a configuration is also possible in which the relay device 101 performs decomposition of the system safety level of the communication system of which the system ID is "S103", in addition to discarding the frame F3 in step S316. More specifically, the relay device 101 generates relay condition information indicating that a malfunction detection mechanism should be added, for example, and transmits a frame including the generated relay condition information to the vehicle-mounted ECU 111C.

The vehicle-mounted ECU 111C adds the malfunction detection mechanism in accordance with the relay condition information obtained from the frame received from the relay device 101. Thus, the system safety level of the communication system of which the system ID is "S103" can be increased, and consequently, the frames F2, F3, F4, and F5 transmitted between the vehicle-mounted ECUs 111A and 111C satisfy the relay processing conditions and the frames F2, F3, F4, and F5 can be relayed by the relay device 101.

Note that, in the vehicle-mounted communication system 301 according to the embodiment of the present disclosure, the system management list Lsy stored in the storage unit 51 of the relay device 101 shows correspondence between each pair of vehicle-mounted ECUs 111 and a system safety level that is set further based on data for a safety mechanism added to frames transmitted between the vehicle-mounted ECUs 111, but there is no limitation to this configuration. A configuration is also possible in which the system management list Lsy stored in the storage unit 51 shows correspondence between each pair of vehicle-mounted ECUs 111 and a system safety level that is set only based on function safety levels of the two vehicle-mounted ECUs 111. In this case, the relay device 101 determines whether or not relay of a frame is permissible based on a result of comparison between a required safety level and a system safety level that is only based on the function safety levels of the two vehicle-mounted ECUs 111.

In the vehicle-mounted communication system 301 according to the embodiment of the present disclosure, the vehicle-mounted ECUs 111 transmit level information L1 to the relay device 101 by including the level information L1 in LLDP frames, but there is no limitation to this configuration. A configuration is also possible in which the vehicle-mounted ECUs 111 do not notify the relay device 101 of their function safety levels. That is, a configuration is also possible in which the vehicle-mounted ECUs 111 do not include the level information L1 in LLDP frames. In this case, a configuration is also possible in which the updating unit 31 of the relay device 101 does not update the system management list Lsy stored in the storage unit 51.

Alternatively, a configuration is also possible in which the vehicle-mounted ECUs 111 transmit level information L1 to the relay device 101 by including the level information L1 in frames that are in accordance with a protocol other than the LLDP, instead of including the level information L1 in LLDP frames. For example, a configuration is also possible in which the vehicle-mounted ECUs 111 transmit level information L1 to the relay device 101 by including the level information L1 in frames that are in accordance with SNMP (Simple Network Management Protocol).

In the vehicle-mounted communication system 301 according to the embodiment of the present disclosure, each vehicle-mounted ECU 111 transmits level information L2 to the relay device 101 by including the level information L2 in a frame F1 in which a service search message is stored, but there is no limitation to this configuration. A configuration is also possible in which each vehicle-mounted ECU 111 does not notify the relay device 101 of the required safety level that is required for communication between the vehicle-mounted ECU 111 and other vehicle-mounted ECUs 111. That is, a configuration is also possible in which each vehicle-mounted ECU 111 does not include the level information L2 in the frame F1. In this case, a configuration is also possible in which the updating unit 31 of the relay device 101 does not update the service management list Lse stored in the storage unit 51.

Alternatively, a configuration is also possible in which each vehicle-mounted ECU 111 transmits the level information L2 to the relay device 101 by including the level information L2 in a frame other than the frame F1 in which a service search message is stored.

In the vehicle-mounted communication system 301 according to the embodiment of the present disclosure, the relay device 101 receives frames F2, F3, F4, and F5 in which messages that are in accordance with the SOME/IP are stored, and determines whether or not relay of the frames F2, F3, F4, and F5 is permissible based on a result of comparison between a required safety level corresponding to the service ID included in the messages and a system safety level, but there is no limitation to this configuration. A configuration is also possible in which the relay device 101 receives a frame other than frames in which messages that are in accordance with the SOME/IP are stored, and determines whether or not relay of the received frame is permissible.

In the vehicle-mounted communication system 301 according to the embodiment of the present disclosure, when the relay device 101 has determined not to relay a frame, the relay device 101 notifies a vehicle-mounted ECU 111 that is the transmission source of the frame of conditions that need to be satisfied to relay the frame to a vehicle-mounted ECU 111 that is the destination of the frame, but there is no limitation to this configuration. A configuration is also possible in which the relay device 101 does not notify the vehicle-mounted ECU 111 that is the transmission source of the frame of the conditions. That is, a configuration is also possible in which the relay device 101 does not include the notification unit 41.

Also, in the relay device 101 according to the embodiment of the present disclosure, the setting unit 21 obtains a service ID from a service search message stored in a frame F1 received from the relay unit 11, and sets relay processing conditions with use of the obtained service ID, but there is no limitation to this configuration. A configuration is also possible in which the setting unit 21 sets relay processing conditions in advance with use of each service ID included in the service management list Lse.

Also, in the relay device 101 according to the embodiment of the present disclosure, the relay unit 11 performs processing for relaying a frame in accordance with content of the setting performed by the setting unit 21, but there is no limitation to this configuration. For example, a configuration is also possible in which, every time a frame is received by the relay unit 11, the setting unit 21 determines whether or not relay of the frame is permissible. Specifically, the following configuration may be adopted.

Upon receiving a frame from a vehicle-mounted ECU 111, the relay unit 11 outputs the received frame to the setting unit 21, and suspends relay of the frame until the relay unit 11 receives an instruction from the setting unit 21.

The setting unit 21 determines whether or not relay of the frame is permissible based on a result of comparison between a required safety level and a system safety level. Specifically, upon receiving a frame from the relay unit 11, the setting unit 21 obtains a service ID from a message stored in the received frame, and obtains a required safety level corresponding to the obtained service ID from the service management list Lse stored in the storage unit 51. Also, the setting unit 21 obtains the system safety level of a communication system indicated by the destination MAC address and the transmission source MAC address of the frame from the system management list Lsy stored in the storage unit 51. Then, the setting unit 21 compares the obtained required safety level and the obtained system safety level, and if the system safety level is higher than or equal to the required safety level, outputs a relay instruction indicating that the frame should be relayed, to the relay unit 11, and if the system safety level is lower than the required safety level, outputs a discard instruction indicating that the frame should be discarded, to the relay unit 11.

The relay unit 11 relays a frame based on the result of determination of the setting unit 21. Specifically, when the relay unit 11 has received a relay instruction from the setting unit 21, the relay unit 11 relays the frame of which relay has been suspended to the destination vehicle-mounted ECU 111. On the other hand, when the relay unit 11 has received a discard instruction from the setting unit 21, the relay unit 11 discards the frame of which relay has been suspended, without relaying the frame.

The foregoing embodiments are to be construed in all respects as illustrative and not restrictive. The scope of the present invention is defined by the claims rather than the description above, and is intended to include all modifications within the meaning and scope of the claims and equivalents thereof.

The above description includes features described in the following supplementary note.

Supplementary Note 1

A vehicle-mounted communication system includes a plurality of vehicle-mounted devices; and a relay device, wherein a first vehicle-mounted device of the vehicle-mounted devices transmits a frame addressed to a second vehicle-mounted device of the vehicle-mounted devices to the relay device, the frame being a frame for transmission and reception of information between the first vehicle-mounted device and the second vehicle-mounted device, the relay device determines whether or not relay of the frame to the second vehicle-mounted device is permissible based on a result of comparison between a required safety level and a system safety level, the required safety level being a level of safety required for communication between the first vehicle-mounted device and the second vehicle-mounted device, the system safety level being at least based on function safety levels of the first vehicle-mounted device and the second vehicle-mounted device regarding safety of a vehicle, and the relay device performs setting relating to permission and prohibition of relay based on the result of comparison, and performs processing for relaying the frame in accordance with content of the setting.

Supplementary Note 2

A communication method performed in a vehicle-mounted communication system that includes a plurality of vehicle mounted devices and a relay device, the communication method includes a step of transmitting, by a first vehicle-mounted device of the vehicle-mounted devices, a frame addressed to a second vehicle-mounted device of the vehicle mounted devices to the relay device, the frame being a frame for transmission and reception of information between the first vehicle-mounted device and the second vehicle-mounted device, and a step of determining, by the relay device, whether or not relay of the frame to the second vehicle mounted device is permissible based on a result of comparison between a required safety level and a system safety level, the required safety level being a level of safety required for communication between the first vehicle-mounted device and the second vehicle mounted device, the system safety level being at least based on function safety levels of the first vehicle-mounted device and the second vehicle mounted device regarding safety of a vehicle.

The invention claimed is:

1. A vehicle-mounted communication system comprising:

a plurality of vehicle-mounted devices; and a relay device, wherein a first vehicle-mounted device of the vehicle-mounted devices transmits a frame addressed to a second vehicle-mounted device of the vehicle-mounted devices to the relay device, the frame being a frame for transmission and reception of information between the first vehicle-mounted device and the second vehicle-mounted device, and the relay device determines whether or not relay of the frame to the second vehicle-mounted device is permissible based on a result of comparison between a required safety level and a system safety level, the required safety level being a level of safety required for communication between the first vehicle-mounted device and the second vehicle-mounted device, the system safety level being at least based on function safety levels of the first vehicle-mounted device and the second vehicle-mounted device regarding safety of a vehicle; wherein the first vehicle-mounted device transmits the frame in which a message that is in accordance with SOME/IP (Scalable service-Oriented MiddlewarE over IP) is stored to the relay device, and the relay device determines whether or not relay of the frame to the second vehicle-mounted device is permissible based on a result of comparison between the required safety level corresponding to a service ID included in the message and the system safety level, and when the relay device has determined not to relay the frame to the second vehicle-mounted device, the relay device notifies the first vehicle-mounted device of a condition that needs to be satisfied to relay the frame to the second vehicle-mounted device.

2. The vehicle-mounted communication system according to claim 1, wherein the relay device determines whether or not relay of the frame to the second vehicle-mounted device is permissible based on a result of comparison between the required safety level and the system safety level that is further based on data for a safety mechanism added to the frame.

3. The vehicle-mounted communication system according to claim 1, wherein the relay device includes a storage unit in which a system management list showing correspondence between a pair of the vehicle-mounted devices and the system safety level is stored, each of the vehicle-mounted devices notifies the relay device of the function safety level of the vehicle-mounted device, and the relay device updates the system management list stored in the storage unit based on the function safety levels that the relay device is notified of by the vehicle-mounted devices.

4. The vehicle-mounted communication system according to claim 1, wherein the relay device includes a storage unit in which a service management list showing correspondence between a type of information transmitted between the vehicle-mounted devices and the required safety level is stored, each of the vehicle-mounted devices notifies the relay device of the required safety level required for communication between the vehicle-mounted device and other vehicle-mounted devices included in the vehicle-mounted communication system, and the relay device updates the service management list stored in the storage unit based on the required safety levels that the relay device is notified of by the vehicle-mounted devices.

5. The vehicle-mounted communication system according to claim 1, wherein, when the relay device has determined not to relay the frame to the second vehicle-mounted device, the relay device notifies the first vehicle-mounted device of a condition that needs to be satisfied to relay the frame to the second vehicle-mounted device.

6. A relay device to be used in a vehicle-mounted communication system including a plurality of vehicle-mounted devices, the relay device comprising:

a setting unit that performs setting relating to permission and prohibition of relay of a frame for transmission and reception of information between the vehicle-mounted devices based on a result of comparison between a required safety level and a system safety level, the required safety level being a level of safety required for communication between the vehicle-mounted devices, the system safety level being at least based on function safety levels of the respective vehicle-mounted devices regarding safety of a vehicle; and a relay unit that performs processing for relaying the frame in accordance with content of the setting performed by the setting unit; and wherein a transmitted frame, having a message, is transmitted by one of the plurality of vehicle-mounted devices is stored to the relay device, and the relay device determines whether or not relay of the transmitted frame to another one of the plurality of vehicle-mounted devices is permissible based on a result of comparison between the required safety level corresponding to a service ID included in the message and the system safety level, and when the relay device has determined not to relay the transmitted frame to the one of the plurality of vehicle-mounted devices, the relay device notifies the one of the plurality of vehicle-mounted devices that transmitted the transmitted frame of a condition that needs to be satisfied to relay the frame to the other one of the plurality of vehicle-mounted devices.

7. A relay method performed by a relay device that is used in a vehicle-mounted communication system including a plurality of vehicle-mounted devices, the relay method comprising:

a step of performing setting relating to permission and prohibition of relay of a frame for transmission and reception of information between the vehicle-mounted devices based on a result of comparison between a required safety level and a system safety level, the required safety level being a level of safety required for communication between the vehicle-mounted devices, the system safety level being at least based on function safety levels of the respective vehicle-mounted devices regarding safety of a vehicle; and storing a transmitted frame on the relay device;

a step of performing processing for relaying the frame in accordance with content of the setting;

wherein the relay device determines whether or not relay of the transmitted frame is permissible based on a result of comparison between the required safety level corresponding to a service ID included in the message and the system safety level, and when the relay device has determined not to relay the frame, the relay device notifies the vehicle-mounted device that transmitted the transmitted frame of a condition that needs to be satisfied to relay the frame.

8. The vehicle-mounted communication system according to claim 2, wherein the relay device includes a storage unit in which a system management list showing correspondence between a pair of the vehicle-mounted devices and the system safety level is stored, each of the vehicle-mounted devices notifies the relay device of the function safety level of the vehicle-mounted device, and the relay device updates the system management list stored in the storage unit based on the function safety levels that the relay device is notified of by the vehicle-mounted devices.

9. The vehicle-mounted communication system according to claim 2, wherein the relay device includes a storage unit in which a service management list showing correspondence between a type of information transmitted between the vehicle-mounted devices and the required safety level is stored, each of the vehicle-mounted devices notifies the relay device of the required safety level required for communication between the vehicle-mounted device and other vehicle-mounted devices included in the vehicle-mounted communication system, and the relay device updates the service management list stored in the storage unit based on the required safety levels that the relay device is notified of by the vehicle-mounted devices.

10. The vehicle-mounted communication system according to claim 3, wherein the relay device includes a storage unit in which a service management list showing correspondence between a type of information transmitted between the vehicle-mounted devices and the required safety level is stored, each of the vehicle-mounted devices notifies the relay device of the required safety level required for communication between the vehicle-mounted device and other vehicle-mounted devices included in the vehicle-mounted communication system, and the relay device updates the service management list stored in the storage unit based on the required safety levels that the relay device is notified of by the vehicle-mounted devices.

* * * * *